(12) United States Patent
Handa

(10) Patent No.: US 11,193,632 B2
(45) Date of Patent: Dec. 7, 2021

(54) GAS FILLING METHOD

(71) Applicant: HONDA MOTOR CO., LTD., Tokyo (JP)

(72) Inventor: Kiyoshi Handa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/972,623

(22) PCT Filed: May 31, 2019

(86) PCT No.: PCT/JP2019/021788
§ 371 (c)(1),
(2) Date: Dec. 7, 2020

(87) PCT Pub. No.: WO2019/235386
PCT Pub. Date: Dec. 12, 2019

(65) Prior Publication Data
US 2021/0262618 A1 Aug. 26, 2021

(30) Foreign Application Priority Data
Jun. 7, 2018 (JP) .............................. JP2018-109582

(51) Int. Cl.
*F17C 5/06* (2006.01)
*F17C 13/02* (2006.01)

(52) U.S. Cl.
CPC .............. *F17C 5/06* (2013.01); *F17C 13/025* (2013.01); *F17C 2221/012* (2013.01); *F17C 2223/0123* (2013.01); *F17C 2250/043* (2013.01)

(58) Field of Classification Search
CPC .... F17C 5/06; F17C 13/025; F17C 2221/012; F17C 2250/043; F17C 2223/0123
(Continued)

(56) References Cited

U.S. PATENT DOCUMENTS 5,628,349 A * 5/1997 Diggins .................... F17C 5/06
141/3
2013/0014855 A1* 1/2013 Yahashi .................. G01M 3/26
141/1
(Continued)

FOREIGN PATENT DOCUMENTS

JP 2006125466 A 5/2006
JP 2016200267 A 12/2016
(Continued)

OTHER PUBLICATIONS

Kiyoshi Handa et al., "Development of An New Hydrogen Refueling Method for FCV", Technical paper, published in 2016, vol. 47 Issue 2 pp. 407-412, published by Transactions of Society of Automotive Engineers of Japan.

*Primary Examiner* — Timothy P. Kelly
*Assistant Examiner* — Stephanie A Shrieves
(74) *Attorney, Agent, or Firm* — CKC & Partners Co., LLC

(57) ABSTRACT

A hydrogen filling system of the present invention is provided with: a pressure accumulator; a pipe connecting the pressure accumulator and a hydrogen tank on a vehicle; a flow volume control valve, a pressure sensor, and a flow volume sensor with which the pipe is fitted; and a station ECU which operates the control valve under a predetermined filling condition. A gas filling method for filling hydrogen gas into the tank from the accumulator is provided with: a step of, after filling of the hydrogen gas has been started, calculating, using a detected value from the pressure sensor when the flow volume of hydrogen gas in the pipe has decreased, the value of a pressure loss coefficient correlated with a pressure loss caused in the pipe; and a step of changing the filling condition to a condition determined on the basis of the value of the pressure loss coefficient.

4 Claims, 6 Drawing Sheets

(58) Field of Classification Search
USPC .............................................................. 141/4
See application file for complete search history.

(56) References Cited

U.S. PATENT DOCUMENTS

| | | | |
|---|---|---|---|
| 2015/0184804 A1* | 7/2015 | Handa | F17C 13/026 141/1 |
| 2016/0305611 A1* | 10/2016 | Handa | F17C 13/023 |
| 2017/0059089 A1* | 3/2017 | Uchida | F17C 13/026 |
| 2017/0074456 A1* | 3/2017 | Handa | F17C 5/06 |
| 2017/0074707 A1* | 3/2017 | Mathison | F17C 5/06 |
| 2019/0086032 A1 | 3/2019 | Handa | |

FOREIGN PATENT DOCUMENTS

| | | |
|---|---|---|
| JP | 2017053458 A | 3/2017 |
| WO | 2011135711 A1 | 11/2011 |
| WO | 2017159314 A1 | 9/2017 |

* cited by examiner

GAS FILLING METHOD

TECHNICAL FIELD

The present invention relates to a gas filling method. More specifically, the present invention relates to a gas filling method for filling a movable body-mounted tank with gas, the movable body-mounted tank being connected to a compressed gas source via a pipe.

BACKGROUND ART

A fuel cell vehicle runs by driving an electric motor using electric power generated by a fuel cell supplied with oxygen-containing air and hydrogen gas as fuel gas. Recently, such fuel cell vehicles including the fuel cell as an energy source for generating power are being put into practical use. The fuel cell requires hydrogen gas to generate electricity. In recent years, fuel cell vehicles have come into the mainstream which store a sufficient amount of hydrogen gas in advance in a high-pressure tank or a hydrogen tank provided with an occlusion alloy, and use the stored hydrogen gas when running. In line with this, research has been actively conducted on filling techniques for quickly filling a tank with as much hydrogen gas as possible at a hydrogen station.

When compressed in a tank, hydrogen gas generates heat. For this reason, in recent years, a technique is dominantly employed which cools hydrogen gas to about −40° using a precooler provided on a flow path of hydrogen gas, thereby inhibiting the temperature in a tank from increasing during the filling of hydrogen gas. Lowering the temperature of hydrogen gas by the precooler in this way makes it possible to inhibit hydrogen gas in the tank from increasing in temperature. Accordingly, the filling of hydrogen gas can be completed quickly.

For example, Non-Patent Document 1 discloses a filling method by which a tank or the like is filled with hydrogen gas while a pressure rise rate is varied according to a predetermined formula during the filling of hydrogen gas. According to the filling method disclosed in Non-Patent Document 1, the formula for determining the pressure rise rate is expressed as a polynomial with temperature parameters obtained by performing a mass averaging processing on a value detected by a temperature sensor provided on a flow path of hydrogen gas downstream of a precooler. The values of coefficients of degrees of the temperature parameters are determined based on maps (see Non-Patent Document 1). According to the filling method disclosed in Non-Patent Document 1, a plurality of such maps are prepared in advance, and a suitable one that corresponds to the tank capacity and the initial pressure of the tank is selected from the plurality of maps, so that the values of the plurality of coefficients are determined based on the selected map.

Non-Patent Document 1: Kiyoshi Handa and Steve Mathison, Development of MC Formula Hydrogen Refueling Method for FCV, Proceedings of Scientific Lecture Meeting, 2015 Autumn Conference, Society of Automotive Engineers of Japan, Inc.

DISCLOSURE OF THE INVENTION

Problems to be Solved by the Invention

Meanwhile, during the filling of hydrogen gas, hydrogen gas flows through a pipe connecting an accumulator of a hydrogen station to a hydrogen tank of a vehicle. Therefore, a considerable pressure loss is caused, and the temperature of hydrogen gas in the tank also increases accordingly. For this reason, the maps used for determining the pressure rise rates according to the filling method described above are constructed with the existence of such a pressure loss taken into account. The pressure loss actually caused during the filling varies depending on various factors, such as the shape of a pipe in the station, the shape of a pipe of the vehicle, and the state of a dust filter inserted in the pipe. However, the conventional filling method does not include estimating a pressure loss actually caused during the filling of hydrogen gas. Therefore, the plurality of maps used for determining the pressure rise rates in the above-described way are constructed on the assumption of the largest pressure loss among credible pressure losses.

As can be seen, since the conventional filling method sets the pressure loss based on the assumption of the worst, a filling time period, a temperature set for the precooler, and the like contain useless excess. Specifically, if an assumed pressure loss is greater than the actual pressure loss, a filling rate is unnecessarily reduced, and consequently, it may take a long time to completely fill a hydrogen tank. In addition, using a map constructed based on the assumption of the pressure loss in the worst-scenario case is equivalent to assuming a case where the pressure loss causes the largest increase of gas temperature, i.e., setting an excessive temperature margin. This means that there is room for raising a temperature set for the precooler.

It is an object of the present invention to provide a gas filling method that enables filling of gas under an optimized filling condition such that the useless excess contained in a filling time period and a temperature set for a precooler, and the like is reduced.

Means for Solving the Problems

A first aspect of the present invention is directed to a gas filling method for filling a movable body-mounted tank (e.g. a hydrogen tank 31 mounted on a movable body M to be described later) with gas supplied from a compressed gas source (e.g., an accumulator 91 to be described later) by means of a gas refueling system (e.g., a hydrogen refueling system S to be described later). The gas refueling system includes the compressed gas source, a pipe (e.g., a station pipe 93 and a vehicle pipe 39) connecting the compressed gas source to the movable body-mounted tank, a control valve (e.g., a flow rate control valve 95 to be described later), a pressure sensor (e.g., a station pressure sensor 73), and a flow rate sensor (e.g., a flow rate sensor 71 to be described later) which are provided on the pipe, and a control unit (e.g., a station ECU 8 to be described later) which controls a flow rate of the gas flowing through the pipe by operating the control valve under a predetermined filling condition. The gas filling method includes: calculating a value of a pressure loss parameter (e.g., a pressure loss coefficient $K_0$ to be described later) having a correlation to a pressure loss caused in the pipe, by using a value which is detected by the pressure sensor when a decrease is caused in the flow rate of the gas in the pipe after start of filling of the gas (e.g., processing in Step S4 of FIG. 4 to be described later); and switching the filling condition to another filling condition which is determined based on the value of the pressure loss parameter so as to continue the filling of the gas (e.g., processing in Steps S5 and S6 of FIG. 4 to be described later).

In a second aspect according to the preceding aspect, the control unit preferably selects, from a plurality of preset filling control maps (e.g., filling control maps M11, . . . , and Mij to be described later), one filling map, and operates the control valve under a filling condition defined in the filling map selected by the control unit. The switching the filling condition preferably includes performing switching from the filling control map selected by the control unit to another filling control map which is included in the plurality of filling control maps and is determined based on the value of the pressure loss parameter.

In a third aspect according to the preceding aspects, the calculating the value of the pressure loss parameter preferably includes determining the value of the pressure loss parameter according to Formula (1) below, $$k_0 = \frac{dP_{loss} \cdot \rho}{dm^2} \quad (1)$$

wherein "$k_0$" is the pressure loss parameter, "$dP_{loss}$" is a pressure difference in the pipe between a pressure before the decrease in the flow rate of the gas and a pressure after the decrease, "$\rho$" is a density of the gas in the pipe, and "dm" is a mass flow rate of the gas in the pipe.

In a fourth aspect according to the preceding aspects, the calculating the value of the pressure loss parameter preferably includes using a value which is detected by the pressure sensor when the flow rate of the gas in the pipe decreases from a value greater than 0 to 0 or to approximately 0 to determine the value of the pressure loss parameter.

Effects of the Invention (1) According to the gas filling method of the present invention, after the start of the filling of gas under the predetermined filling condition, the value of the pressure loss parameter is calculated using the value that is detected by the pressure sensor when the decrease is caused in the flow rate of the gas in the pipe. With this use of the value detected by the pressure sensor when the decrease is caused in the flow rate of the gas, the gas filling method can accurately calculate the value of the pressure loss parameter. The gas filling method of the present invention switches from the filling control condition to another filling condition based on the calculated value of the pressure loss parameter, and continues the filling of gas under the latter filling control condition. By performing switching between the filling control conditions based on the value of the pressure loss parameter in this way, the present invention optimizes the filling condition so that useless excess contained in a temperature set for a precooler and the like is reduced, and can carry out the filling of gas under the optimized filling condition.

(2) The control unit used in the gas filling method of the present invention selects, from the plurality of preset maps, one suitable filling control map, and operates the flow rate control valve under the condition defined in the selected suitable filling control map, thereby controlling the flow rate of the gas flowing through the pipe. According to the present invention, the switching the filling condition includes performing switching from the filling control map selected by the control unit to another filling control map determined based on the value of the pressure loss parameter calculated in the above-described manner, thereby performing switching of the filling conditions. As can be seen, the present invention performs the switching between the filling control maps based on the value of the pressure loss parameter. As a result, an optimal filling control map can be selected according to the value of the pressure loss parameter, from the plurality of filling control maps specified in the control unit in advance. This feature makes it possible to set as short a filling time period as possible according to an actual pressure loss, and to raise a temperature set for the precooler.

(3) The gas filling method of the present invention calculates the value of the pressure loss parameter "$K_0$" defined by Formula (1) described above, using the pressure difference $dP_{loss}$ between the pressures before and after the decrease in the flow rate of the gas, the gas density "$\rho$" in the pipe, and the mass flow rate "dm" of the gas in the pipe. Thus, the present invention makes it possible to calculate the value of the pressure loss parameter by performing a simple calculation.

(4) The gas filling method of the present invention calculates the value of the pressure loss parameter, by using the value that is detected by the pressure sensor when the flow rate of the gas in the pipe decreases from a value greater than 0 to 0 or to approximately 0. Thus, the present invention can accurately calculate the value of the pressure loss parameter, and accordingly, can perform switching to a suitable filling control map corresponding to a state of the pipe.

PREFERRED MODE FOR CARRYING OUT THE INVENTION

Figure 1:
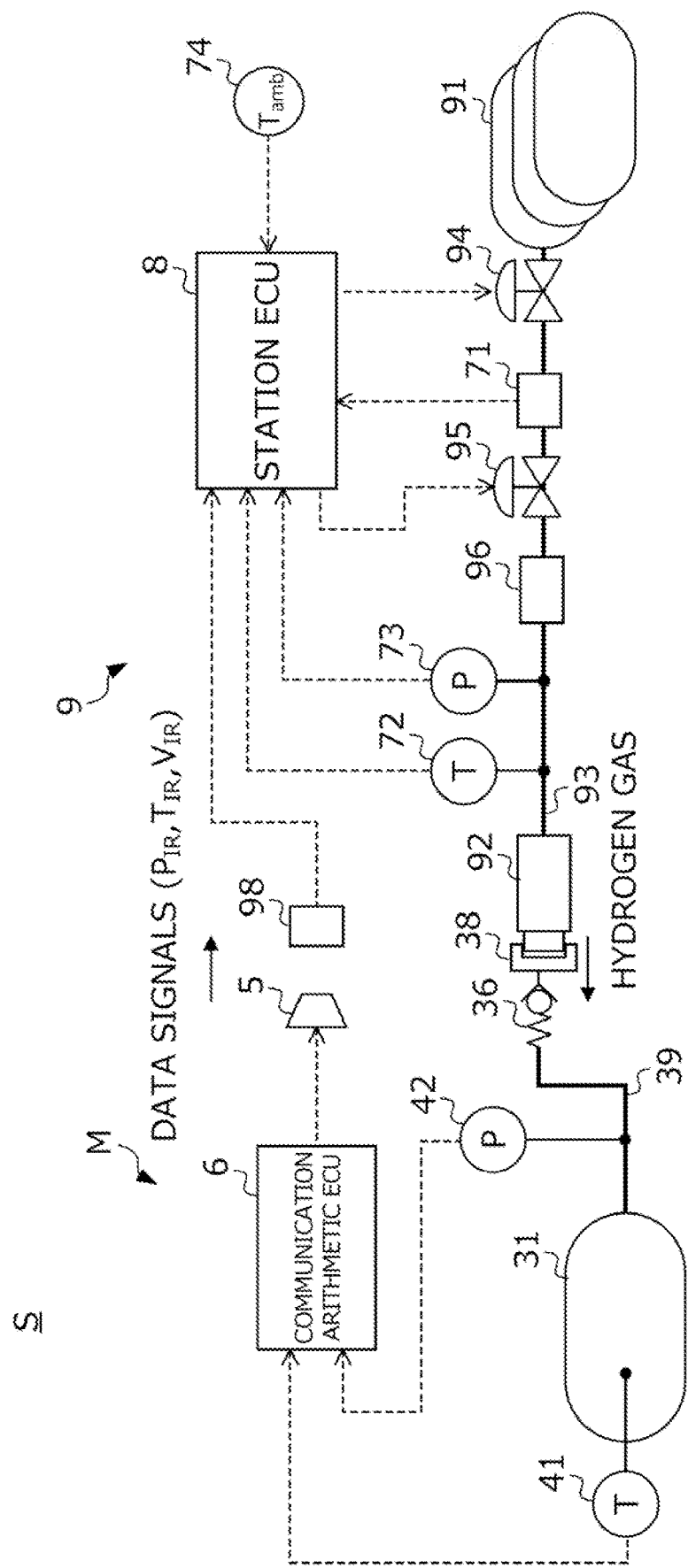
FIG. 1 is a diagram showing a configuration of a hydrogen refueling system to which a hydrogen gas filling method according to an embodiment of the present invention is applied.

An embodiment of the present invention will be described below with reference to the drawings. FIG. 1 is a diagram showing a configuration of a hydrogen refueling system S to which a hydrogen gas filling method according to the present embodiment is applied. The hydrogen refueling system S is constituted by a combination of a hydrogen station 9 having a source of compressed hydrogen gas, and a fuel cell vehicle M (hereinafter abbreviated as the "vehicle M") having a hydrogen tank for receiving hydrogen gas supplied from the hydrogen station 9. The hydrogen gas filling method according to the present embodiment is a method for filling the tank of the vehicle M with hydrogen gas from the hydrogen station 9, and is carried out by means of the hydrogen refueling system S. In the following, a configuration of the vehicle M is first described, followed by a description of a configuration of the hydrogen station 9.

The vehicle M includes the tank that stores hydrogen gas and a fuel cell system (not shown) that generates electricity using the hydrogen gas stored in the tank and air as fuel gas. The vehicle M is a fuel cell automobile that runs by driving its motor using the electric power generated by the fuel cell system. Although the following description is based on the assumption that the vehicle M is such a fuel cell automobile, the present invention is not limited thereto. The present invention is applicable to any movable body as long as the movable body includes a tank for storing hydrogen gas.

The vehicle M includes: the hydrogen tank 31 storing hydrogen gas supplied from the hydrogen station 9; a vehicle pipe 39 extending from the hydrogen tank 31; the fuel cell system (not shown) generating electricity by using hydrogen gas stored in the hydrogen tank 31 to allow the vehicle to run; an infrared transceiver 5 transmitting data signals related to the hydrogen tank 31 to the hydrogen station 9; and a communication arithmetic ECU 6 for generating the data signals to be transmitted by the infrared transceiver 5. Although the following description is based on the vehicle M including the infrared transceiver 5 and the communication arithmetic ECU 6, the present invention is not limited thereto. The present invention is also applicable to a vehicle M which does not include the infrared transceiver 5 or the communication arithmetic ECU 6.

The vehicle pipe 39 includes a receptacle 38 configured to be fitted to a filling nozzle 92 (to be described later) of the hydrogen station 9, and a check valve 36 provided on the vehicle pipe 39 near the receptable 38 and configured to prevent backflow of hydrogen gas from the hydrogen tank 31 toward the receptacle 38.

The communication arithmetic ECU 6 is connected to an in-tank temperature sensor 41 and an in-tank pressure sensor 42 that function as means for acquiring information about the hydrogen tank 31 described above. The in-tank temperature sensor 41 detects a temperature of hydrogen gas in the hydrogen tank 31, and transmits a signal corresponding to the detected value to the communication arithmetic ECU 6. The in-tank pressure sensor 42 detects a pressure in the hydrogen tank 31, and transmits a signal corresponding to the detected value to the communication arithmetic ECU 6.

The communication arithmetic ECU 6 is a microcomputer composed of, for example, an interface for performing A/D conversion of the detection signals from the sensors 41, 42, a CPU for performing a signal generation processing to be described later, a drive circuit for driving the infrared transceiver 5 in a mode determined based on the processing, and a storage device for storing various data.

The storage device of the communication arithmetic ECU 6 stores programs related to execution of data signal generation processing to be described later, and specific information including the value of volume of the hydrogen tank 31 mounted to the vehicle M at the factory. The specific information includes, in addition to the value of volume of the hydrogen tank, information about the hydrogen tank 31 that can be specified at the factory, such as a capacity deduced from the value of volume according to a known conversion law, and the material forming the hydrogen tank.

The CPU of the communication arithmetic ECU 6 starts the signal generation processing to generate a signal to be transmitted from the transceiver 5 to the hydrogen station 9, in response to opening of a fuel lid that protects the receptacle 38, for example. The CPU of the communication arithmetic ECU 6 ends the signal generation processing, in response to entry into a state where the filling of hydrogen gas is impossible due to, for example, disconnection of the above-described nozzle from the receptacle 38.

During the signal generation processing, a temperature transmission value $T_{IR}$ equivalent to a current value of the temperature in the hydrogen tank, a pressure transmission value $P_{IR}$ equivalent to a current value of the pressure in the hydrogen tank, and a volume transmission value $V_{IR}$ equivalent to a current value of the volume of the hydrogen tank are acquired in a predetermined cycle, and data signals corresponding to these values ($T_{IR}$, $P_{IR}$, $V_{IR}$) are generated. As the temperature transmission value $T_{IR}$, a value detected by the in-tank temperature sensor 41 at that moment is used. As the pressure transmission value $P_{IR}$, a value detected by the in-tank pressure sensor 42 at that moment is used. As the volume transmission value $V_{IR}$, the value stored in the above-described storage device is used.

The drive circuit of the communication arithmetic ECU 6 drives the infrared transceiver 5 (to blink) in response to the data signals generated by the signal generation processing and abort signals. In this way, the data signals that include state information (i.e., the temperature transmission value $T_{IR}$, the pressure transmission value $P_{IR}$, etc.) about a state in the hydrogen tank and the specific information (i.e., the volume transmission value $V_{IR}$, etc.) are transmitted to the hydrogen station 9.

The hydrogen station 9 includes: an accumulator 91 that stores, at a high pressure, hydrogen gas to be supplied to the vehicle M; a station pipe 93 extending from the accumulator 91 to the filling nozzle 92 for ejecting hydrogen gas; a shut-off valve 94 and a flow rate control valve 95 provided on the station pipe 93; and a station ECU 8 that controls the valves 94, 95.

The station ECU 8 is a computer. After the filling nozzle 92 is connected to the receptacle 38 provided to the vehicle M, the station ECU 8 controls a flow rate of hydrogen gas flowing through the station pipe 93 by operating the shut-off valve 94 and the flow rate control valve 95 under a predetermined filling condition, and fills the hydrogen tank 31 of the vehicle M with the high-pressure hydrogen gas stored in the accumulator 91.

In the hydrogen refueling system S, connecting the filling nozzle 92 to the receptacle 38 causes the station pipe 93 as a component forming part of the hydrogen station 9 and the vehicle pipe 39 as a component forming part of the vehicle M to form one pipe, which connects the hydrogen tank 31 and the accumulator 91 to each other.

A precooler 96 for cooling hydrogen gas is provided on the station pipe 93 between the flow rate control valve 95 and the filling nozzle 92. The precooler 96 cools hydrogen gas at a position before a location where the hydrogen gas is received in the hydrogen tank 31, thereby inhibiting the hydrogen gas in the hydrogen tank 31 from increasing in temperature. As a consequence, quick filling can be achieved.

The station ECU 8 has sensors 71, 72, 73, 74 of different types connected thereto, for the purpose of acquiring information about a state of hydrogen gas at positions before the location where the hydrogen gas is received in the hydrogen tank 31.

The flow rate sensor 71 is provided on the station pipe 93 between the shut-off valve 94 and the flow rate control valve 95, and transmits, to the station ECU 8, a signal corresponding to a mass per unit time, i.e., a mass flow rate of hydrogen gas flowing through the station pipe 93.

The station temperature sensor 72 is provided on the station pipe 93 downstream of the precooler 96, and transmits, to the station ECU 8, a signal corresponding to a temperature of hydrogen gas in the station pipe 93.

The station pressure sensor 73 is provided on the station pipe 93 downstream of the precooler 96, and transmits, to the station ECU 8, a signal corresponding to a pressure of hydrogen gas in the station pipe 93.

The ambient temperature sensor 74 detects an ambient temperature, and transmits, to the station ECU 8, a signal corresponding to the detected value. In some cases, the ambient temperature detected by the ambient temperature sensor 74 can be regarded as the temperature of hydrogen gas in the hydrogen tank of the vehicle M at the time of start of the filling.

The filling nozzle 92 is provided with an infrared transceiver 98 for communication with the vehicle M. When the filling nozzle 92 is connected to the receptacle 38, the infrared transceiver 98 comes to face the infrared transceiver 5 provided to the vehicle M, enabling transmission and reception of data signals between the transceivers 98, 5 via infrared rays.

Figure 2:
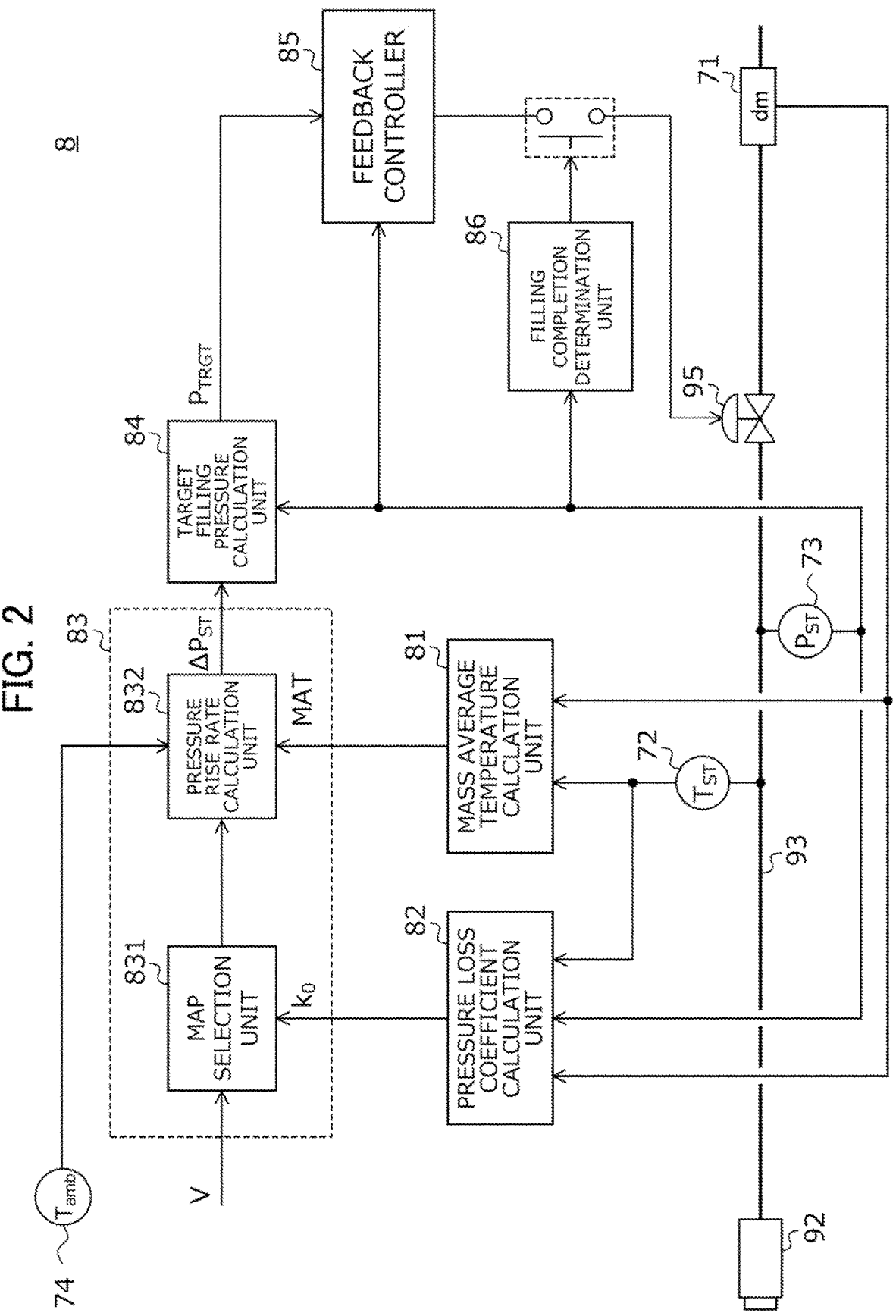
FIG. 2 is a functional block diagram showing a configuration of a control circuit used by a station ECU for performing filling flow rate control.

FIG. 2 is a functional block diagram showing a configuration of a control circuit used by the station ECU 8 for performing filling flow rate control. The station ECU 8 performs the filling flow rate control such that the station ECU 8 determines a target pressure rise rate according to a state of the hydrogen tank of the vehicle, and operates the flow rate control valve 95 to achieve the target pressure rise rate. FIG. 2 only shows modules 81 to 86 forming part of the station ECU 8, the modules 81 to 86 participating in implementation of the filling flow rate control.

The mass average temperature calculation unit 81 calculates a mass average temperature MAT of hydrogen gas that has passed through the precooler 96, based on the values detected by the station temperature sensor 72 and the flow rate sensor 71. The mass average temperature MAT is used by the target pressure rise rate setting unit 83 to set the target pressure rise rate. Immediately following the start of the filling of hydrogen gas, it takes about several tens of seconds for the value detected by the station temperature sensor 72 to become equal to a temperature of gas actually flowing out of the precooler 96. Accordingly, the mass average temperature calculation unit 81 outputs a preset value as the mass average temperature MAT without using the value detected by the station temperature sensor 72, until the lapse of a period of several tens of seconds (more specifically, 30 seconds, for example) from the start of the filling.

The pressure loss coefficient calculation unit 82 calculates a pressure loss coefficient $k_0$ which is a parameter having a correlation to a pressure loss caused in the station pipe 93 and the vehicle pipe 39 (hereinafter, these pipes are also collectively referred to as the "connection pipe") when hydrogen gas flows through the station pipe 93 and the vehicle pipe 39. The pressure loss as used herein refers to a pressure difference which arises when hydrogen gas flows through the connection pipe, and which is determined between a predetermined upstream location (e.g., the detection position of the station pressure sensor 73) and a predetermined downstream location (e.g., the inside of the hydrogen tank 31).

Next, the definition of the pressure loss coefficient $K_0$ and a method for calculating the same will be described. A pressure loss $dP_{loss}$ caused in a typical gas flow path is given by Formula (2) below, using a dimensionless loss coefficient $\zeta$, a gas density $\rho$, and a flow velocity v.

$$dP_{loss} = \frac{\zeta \cdot \rho \cdot v^2}{2} \quad (2)$$

Referring to Formula (2) above, the flow velocity v is not measured in the common hydrogen station 9. Accordingly, the flow velocity v is given by Formula (3) below, using the mass flow rate dm that can be measured by the flow rate sensor 71. In Formula (3), "A" is a flow path cross-sectional area.

$$v = \frac{dm}{A \cdot \rho} \quad (3)$$

The pressure loss coefficient $K_0$ of the present embodiment is defined as in Formula (4) below, using the loss coefficient $\zeta$ and the flow path cross-sectional area A of Formulas (2) and (3) above. As can be seen from Formula (4), the value of the pressure loss coefficient $K_0$ is determined depending on the shape of a flow path of hydrogen gas formed in the connection pipe.

$$k_0 = \frac{\zeta}{2A^2} \quad (4)$$

Based on Formulas (2) to (4) above, the pressure loss coefficient $K_0$ can be expressed by Formula (5), using the pressure loss $dP_{loss}$, the gas density $\rho$, and the mass flow rate dm. As can be seen from Formula (5) below, the pressure loss $dP_{loss}$ increases as the pressure loss coefficient $K_0$ increases. In Formula (5) below, the pressure loss $dP_{loss}$ can be calculated using values which are detected by the station pressure sensor 73 when a decrease is caused in the flow rate of hydrogen gas in the connection pipe. The mass flow rate dm can be measured by the flow rate sensor 71. The gas density $\rho$, which can be expressed as a function of the pressure and temperature of hydrogen gas, can be calculated from the values detected by the station temperature sensor 72 and the station pressure sensor 73. For these reasons, following the start of the filling of hydrogen gas filling, the pressure loss coefficient calculation unit 82 performs the calculation expressed by Formula (5), using the value that is detected by the station pressure sensor 73 when the decrease is caused in the flow rate of hydrogen gas in the connection pipe, and the value detected by the flow rate sensor 71, thereby calculating the value of the pressure loss coefficient $K_0$.

$$k_0 = \frac{dP_{loss} \cdot \rho}{dm^2} \quad (5)$$

The target pressure rise rate setting unit 83 sets the target pressure rise rate $\Delta P_{ST}$, which is equivalent to a target value of pressure rise rate of hydrogen gas in the connection pipe during the filling, based on the mass average temperature MAT calculated by the mass average temperature calculation unit 81, the pressure loss coefficient $K_0$ calculated by the pressure loss coefficient calculation unit 82, the ambient temperature $T_{amb}$, detected by the ambient temperature sensor 74, the tank volume V of the hydrogen tank 31, etc. More specifically, the target pressure rise rate setting unit 83 uses a map selection unit 831 and a pressure rise rate calculation unit 832 to set the target pressure rise rate $\Delta P_{ST}$.

The map selection unit 831 has a storage medium storing a plurality of filling control maps. The filling control map associates the ambient temperature $T_{amb}$ with the values of a plurality of coefficients (a, b, c, d) that characterize a model formula (see Formula (6) to be described later) which is used to set the target pressure rise rate $\Delta P_{st}$. In other words, the filling control map defines a filling condition for the filling flow rate control.

Figure 3:
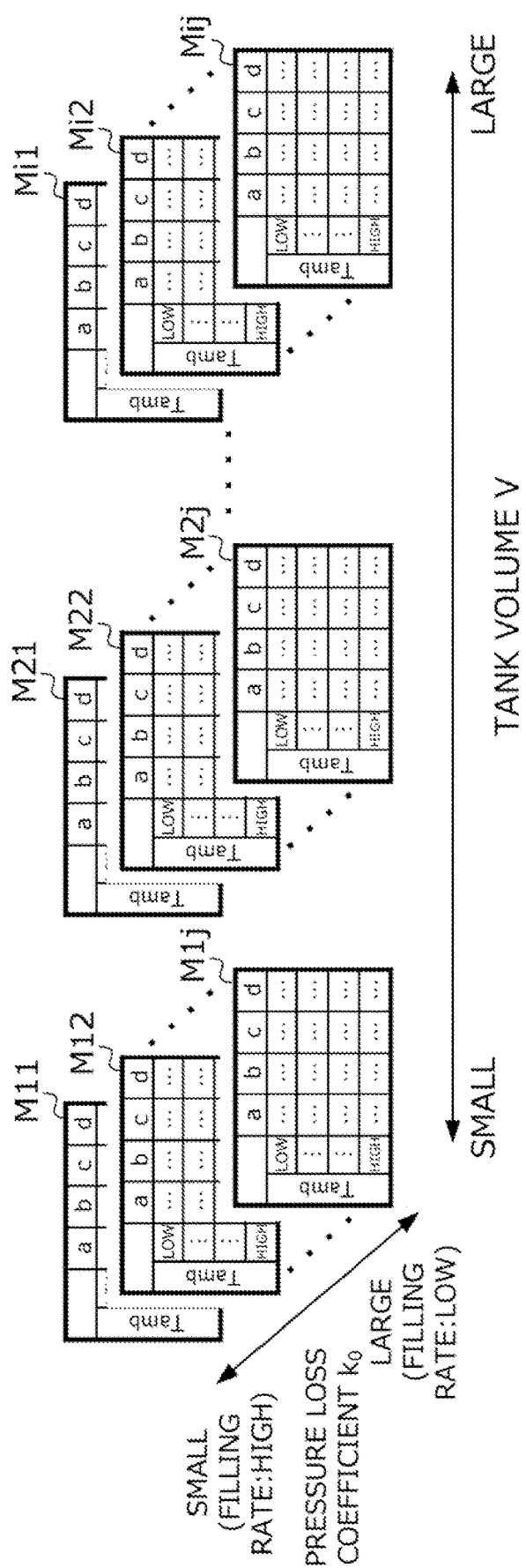
FIG. 3 is a diagram for explaining a procedure according to which a map selection unit selects a filling control map.

FIG. 3 is a diagram for explaining a procedure according to which the map selection unit 831 selects one filling control map. The filling condition for completely filling the hydrogen tank as quickly as possible varies depending on the tank volume of the connected hydrogen tank and the value of the pressure loss coefficient of the connection pipe. In view of this, in the present embodiment, the tank volume is classified into i levels (i is an integer of 2 or greater), the pressure loss coefficient is classified into j levels (j is an integer of 2 or greater), and i×j maps, namely, maps M11, M12, ..., M1j, M21, M22, ..., M2j, ..., Mi1, Mi2, ..., and Mij, each of which is suitable to one of the combinations of the volumes and the pressure loss coefficients, are constructed in advance. The i×j maps are stored in the storage medium of the map selection unit 831.

The map selection unit 831 acquires the value of the volume V of the hydrogen tank 31 and that of the pressure loss coefficient $k_0$, and selects, from the i×j maps, one map which corresponds to the values of the volume V and the pressure loss coefficient $k_0$. The map selection unit 831 then transmits the selected map to the pressure rise rate calculation unit 832. Meanwhile, an increase in the pressure loss coefficient increases the pressure loss caused in the connection pipe, and further raises the temperature of hydrogen gas in the pipe. Therefore, as the value of the pressure loss coefficient $k_0$ calculated by the pressure loss coefficient calculation unit 82 increases, the map selection unit 831 selects a map corresponding to a lower filling rate such that the temperature rise due to the pressure loss is reduced or prevented.

As described above, the map selection unit 831 requires the value of the volume V of the hydrogen tank 31 and the value of the pressure loss coefficient $k_0$ to select a suitable filling control map. The map selection unit 831 can acquire the value of the volume V of the hydrogen tank 31, as one of the required values, immediately following the start of the filling, by using the volume transmission value $V_{IR}$ transmitted from the infrared transceiver 5 of the vehicle M. On the other hand, the value of the pressure loss coefficient $k_0$ is calculated in the period in which the flow rate of hydrogen gas flowing through the connection pipe temporarily decreases after the start of the filling of hydrogen gas, as described earlier. Thus, the map selection unit 831 can acquire the value of the pressure loss coefficient $k_0$ only after the lapse of a certain period of time following the start of the filling.

Therefore, at the instant following the start of the filling and in which the value of the pressure loss coefficient $K_0$ has not yet been acquired, the map selection unit 831 selects a filling control map that corresponds to the value of the volume V of the hydrogen tank 31 acquired via the infrared communication as described above, and a preset value of the pressure loss coefficient $K_0$. At this time, while assuming the value of the pressure loss coefficient $K_0$ to be an estimated value which is higher than an actual value, more specifically, for example, the highest value in a credible range of the pressure loss coefficient of the hydrogen station in use, the map selection unit 831 selects, as a provisional map, a filling control map corresponding to the value of the volume V of the hydrogen tank 31. The filling is carried out according to the provisional map.

Thereafter, when the value of the pressure loss coefficient $K_0$ is acquired, the map selection unit 831 selects, as a non-provisional Tap, a filling control map corresponding to the acquired value of the pressure loss coefficient $K_0$, and the filling is continued according to this non-provisional map. In this way, a suitable filling control map corresponding to the actual pressure loss can be selected so that the hydrogen tank 31 is completely filled as quickly as possible.

The pressure rise rate calculation unit 832 performs calculation according to Formula (6) below, using the mass average temperature MAT, the ambient temperature $T_{amb}$, and the filling control map selected by the map selection unit 831, and thereby determines a filling time period $t_{final}$ equivalent to a period from a predetermined filling start time $t_{ini}$ to a predetermined scheduled filling end time.

$$t_{final} = a(T_{amb})MAT^3 + b(T_{amb})MAT^2 + c(T_{amb})MAT + d(T_{amb}) \qquad (6)$$

In Formula (6), the values of the four coefficients (a, b, c, d) are each calculated by way of a search through the filling control map selected by the map selection unit 831, based on the ambient temperature $T_{amb}$ detected by the ambient temperature sensor 74. The pressure rise rate calculation unit 832 sets the target pressure rise rate $\Delta P_{st}$ such that the hydrogen tank 31 is completely filled at the lapse of the filling time period $t_{final}$ starting from the filling start time $t_{ini}$.

The target filling pressure calculation unit 84 calculates a target filling pressure $P_{TRGT}$ equivalent to a target value of a filling pressure at the lapse of a predetermined period, by using the target pressure rise rate $\Delta P_{st}$ set by the target pressure rise rate setting unit 83 and the detection value $P_{ST}$ (hereinafter also referred to as the "filling pressure") detected by the station pressure sensor 73.

The feedback controller 85 determines a designated degree of opening of the flow rate control valve 95 based on a known control law such that at the designated degree of opening, the filling pressure $P_{ST}$ becomes equal to the target filling pressure $P_{TRGT}$. The feedback controller 85 inputs the designated degree of opening into a drive device (not shown) of the flow rate control valve 95. The drive device adjusts the degree of opening of the flow rate control valve 95 to achieve the designated degree of opening. As a result, the hydrogen tank 31 is filled with hydrogen gas such that the target pressure rise rate $\Delta P_{st}$ set by the target pressure rise rate setting unit 83 is achieved.

The filling completion determination unit 86 determines whether the filling has been completed. When determining that the filling has been completed, the filling completion determination unit 86 sets the designated degree of opening to 0 to end the filling of hydrogen gas. More specifically, the filling completion determination unit 86 determines that the hydrogen tank 31 has been completely filled when the filling pressure $P_{ST}$ detected by the station pressure sensor 73 exceeds a predetermined completion threshold, and sets the designated degree of opening to 0 to end the filling of hydrogen gas.

Figure 4:
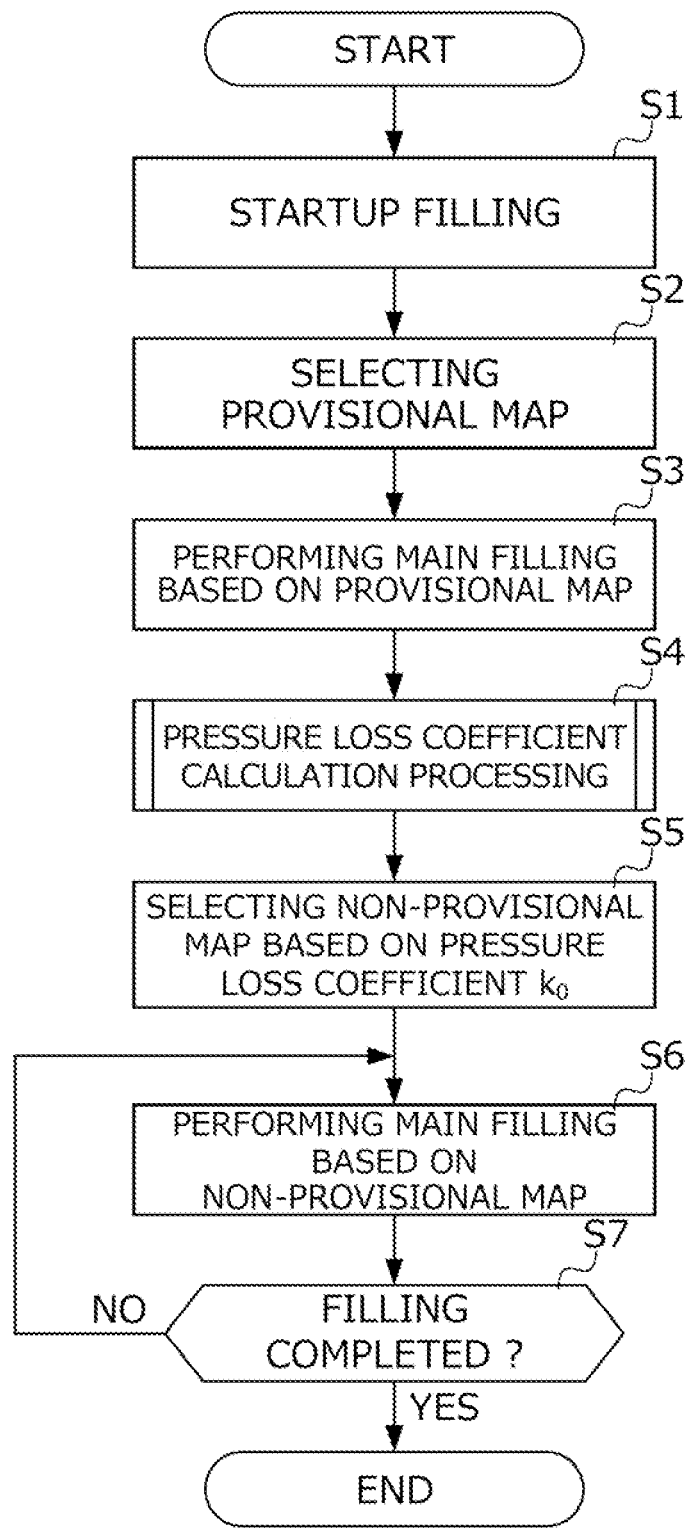
FIG. 4 is a flowchart showing a procedure according to which the hydrogen refueling system fills a tank with hydrogen gas.

Next, a specific procedure will be described, according to which the hydrogen refueling system S described above fills the hydrogen tank 31 with hydrogen gas. FIG. 4 is a flowchart showing the procedure according to which the hydrogen refueling system S fills the tank with hydrogen gas. This procedure starts in response to connection of the filling nozzle 92 of the hydrogen station 9 to the receptacle 38 of the vehicle M, i.e., at the instant when the filling of hydrogen gas is ready to start.

In Step S1, the station ECU 8 first carries out startup filling. More specifically, while the flow rate control valve 95 provided on the station pipe 93 is in a fully closed state, the shut-off valve 94 provided upstream of the flow rate control valve 95 is opened. The pressure in the station pipe 93 is increased until a value detected by the station pressure sensor 73 provided upstream of the flow rate control valve 95 indicates a predetermined value. Thereafter, the shut-off valve 94 is closed. As a consequence, a storage segment from the flow rate control valve 95 to the shut-off valve 94 in the station pipe 93 is filled with hydrogen gas in an amount corresponding to the pressure. Next, the flow rate control valve 95 is opened while the shut-off valve 94 is maintained closed. As a consequence, the hydrogen gas compressed in the storage segment flows into the hydrogen tank 31 at once, whereby the inside of the hydrogen tank 31 and the inside of the station pipe 93 are made uniform. Further, in Step S1, in addition to the startup filling carried out in the above-described manner, the start time of the startup filling is set as the filling start time $t_{in1}$ that is needed for the above-described target pressure rise rate setting unit 83 to determine the filling time period $t_{final}$. However, the present invention is not limited to this.

In Step S2, the station ECU 8 acquires the value of the volume V of the hydrogen tank 31 via the infrared communication, and selects, from the i×j preset filling control maps, one provisional map corresponding to the value of the volume V. As described earlier, not only the value of the volume V, but also the value of the pressure loss coefficient $K_0$ are needed to select a suitable map. However, at this point of time, the station ECU 8 cannot acquire the value of the pressure loss coefficient $K_0$. Accordingly, as described earlier, while assuming the value of the pressure loss coefficient $K_0$ to be an estimated value which is higher than the actual value, more specifically, for example, the highest value in the credible range of the hydrogen station in use, the station ECU 8 selects, as the provisional map, one filling control map corresponding to the value of the volume V of the hydrogen tank 31, and transmits the selected map to the pressure rise rate calculation unit 832.

In Step S3, the station ECU 8 starts main filling based on the filling control map selected as the provisional map in Step S2. More specifically, the station ECU 8 sets the target pressure rise rate $\Delta P_{st}$ based on the provisional map selected in Step S2, and fills the tank with hydrogen gas such that the target pressure rise rate $\Delta P_{st}$ is achieved. In Step S3, until the lapse of about several tens of seconds (e.g., 30 seconds) from the start of the main filling, it is impossible to use the value detected by the station temperature sensor, as described above. Therefore, until the lapse of the period from the start of the filling, the target pressure rise rate setting unit 83 conducts a search through the filling control map based on the preset mass average temperature MAT to determine the filling time period $t_{final}$, and accordingly, the target pressure rise rate $\Delta P_{st}$.

In Step S4, the station ECU 8 performs a pressure loss coefficient calculation processing to determine the value of the pressure loss coefficient $K_0$. Thereafter, the station ECU 8 proceeds to Step S5.

Figure 5:
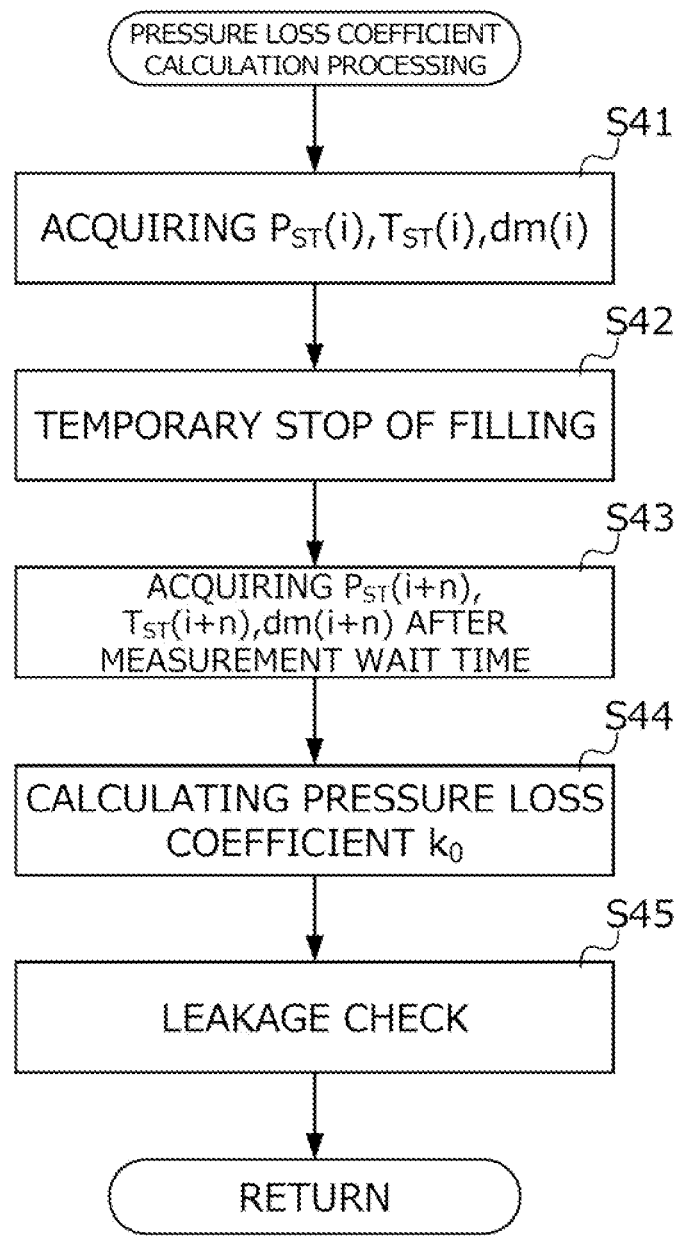
FIG. 5 is a flowchart showing a specific procedure of pressure loss coefficient calculation processing.

FIG. 5 is a flowchart showing a specific procedure of the pressure loss coefficient calculation processing. First, in Step S41, the station ECU 8 acquires values of a pressure $P_{ST}(i)$, a temperature $T_{ST}(i)$, and a flow rate dm(i) in the connection pipe immediately before stopping of the filling of hydrogen gas which takes place in Step S42 to be described later, by using the station pressure sensor 73, the station temperature sensor 72, and the flow rate sensor 71. The station ECU 8 then proceeds to Step S42.

In Step S42, the station ECU 8 temporarily stops the filling of hydrogen gas to perform leakage check to check whether hydrogen gas leaks, and then, proceeds to Step S43. More specifically, the station ECU 8 fully closes the shut-off valve 94 to temporarily stop the filling of hydrogen gas. Note that in the following, a case will be described in which the value of the pressure loss coefficient $K_0$ is calculated while the filling of hydrogen gas is temporarily stopped, i.e., while the flow rate of hydrogen gas in the connection pipe is decreased to 0. However, the present invention is not limited to this. It is possible to carry out Step S42 without completely stopping the filling of hydrogen gas. In other words, the flow rate of hydrogen gas may be decreased to approximately 0.

In Step S43, following the lapse of a predetermined measurement wait time (e.g., about three seconds) from the stop of the filling of hydrogen gas in Step S42, the station ECU 8 acquires a value of a pressure $P_{ST}(i+n)$ in the connection pipe after the lapse of the predetermined wait time, by using the station pressure sensor 73, the station temperature sensor 72, and the flow rate sensor 71. The station ECU 8 then proceeds to Step S44.

In Step S44, the station ECU 8 calculates the value of the pressure loss coefficient $K_0$ by using the value of the pressure $P_{ST}(i)$ and the value of the pressure $P_{ST}(i+n)$ that have been acquired before and after the above-mentioned decrease in the flow rate of hydrogen gas in the connection pipe from a value greater than 0 to 0, the value of the temperature $T_{ST}(i)$, the value of the flow rate dm(i), and Formula (5) described above. The station ECU 8 then proceeds to Step S45.

More specifically, the value of the pressure loss $dP_{loss}$ in Formula (5) described above is calculated according to Formula (7-1), i.e., by subtracting the pressure $P_{ST}(i)$ before the stop of the filling from the pressure $P_{ST}(i+n)$ after the stop of the filling. As the gas density ρ in the Formula (5), a value is used which is calculated by inputting the value of the pressure $P_{ST}(i)$, that of the pressure $P_{ST}(i+n)$, and that of the temperature $T_{ST}(i)$ into a density function ρ[x,y] with a pressure x and a temperature y. More specifically, as shown by Formula (7-2) below, an average of the pressure $P_{ST}(i)$ before the decrease in the flow rate and the pressure $P_{ST}(i+n)$ after the decrease in the flow rate is used to calculate the value of the gas density ρ.

$$dP_{loss} = P_{ST}(i) - P_{ST}(i+n) \quad (7\text{-}1)$$

$$k_0 = \frac{\rho[(P_{ST}(i) + P_{ST}(i+n))/2, T_{ST}(i)] * dP_{loss}}{dm(i)^2} \quad (7\text{-}2)$$

In Step S45, the station ECU 8 performs the leakage check to check whether hydrogen gas leaks, and thereafter, proceeds to Step S5 shown in FIG. 4.

Referring back to FIG. 4, in Step S5, the station ECU 8 selects, as a non-provisional map, one map corresponding to the value of the pressure loss coefficient $K_0$ calculated in Step S4 from the plurality of filling control maps, and then, proceeds to Step S6. As described earlier, in Step S2, the station ECU 8 has selected, from the j filling control maps (Mk1, ..., and Mkj, wherein "k" is an integer from 1 to j) corresponding to the volume V of the hydrogen tank 31, one map corresponding to the maximum pressure loss, i.e., the filling control map Mkj as the provisional map. Accordingly, in Step S5, the station ECU 8 selects, from the j filling control maps (Mk1, ..., and Mkj), one map corresponding to the value of the pressure loss coefficient $K_0$ as the non-provisional map.

In this way, one suitable map corresponding to the pressure loss in the connection pipe is selected.

In Step S6, the station ECU 8 resumes the main filling based on the filling control map selected as the non-provisional map in Step S5. More specifically, the station ECU 8 sets the target pressure rise rate $\Delta P_{st}$ based on the non-provisional map selected in Step S5, and fills the tank with hydrogen gas such that the target pressure rise rate $\Delta P_{st}$ is achieved.

In Step S7, the station ECU 8 determines whether the filling of hydrogen gas has been completed, i.e., whether the hydrogen tank 31 has been completely filled. If the determination result is "No" in Step S7, the station ECU 8 returns to Step S6 to continue the main filling. If the determination result is "Yes" in Step S7, the station ECU 8 ends the filling of hydrogen gas.

Figure 6:
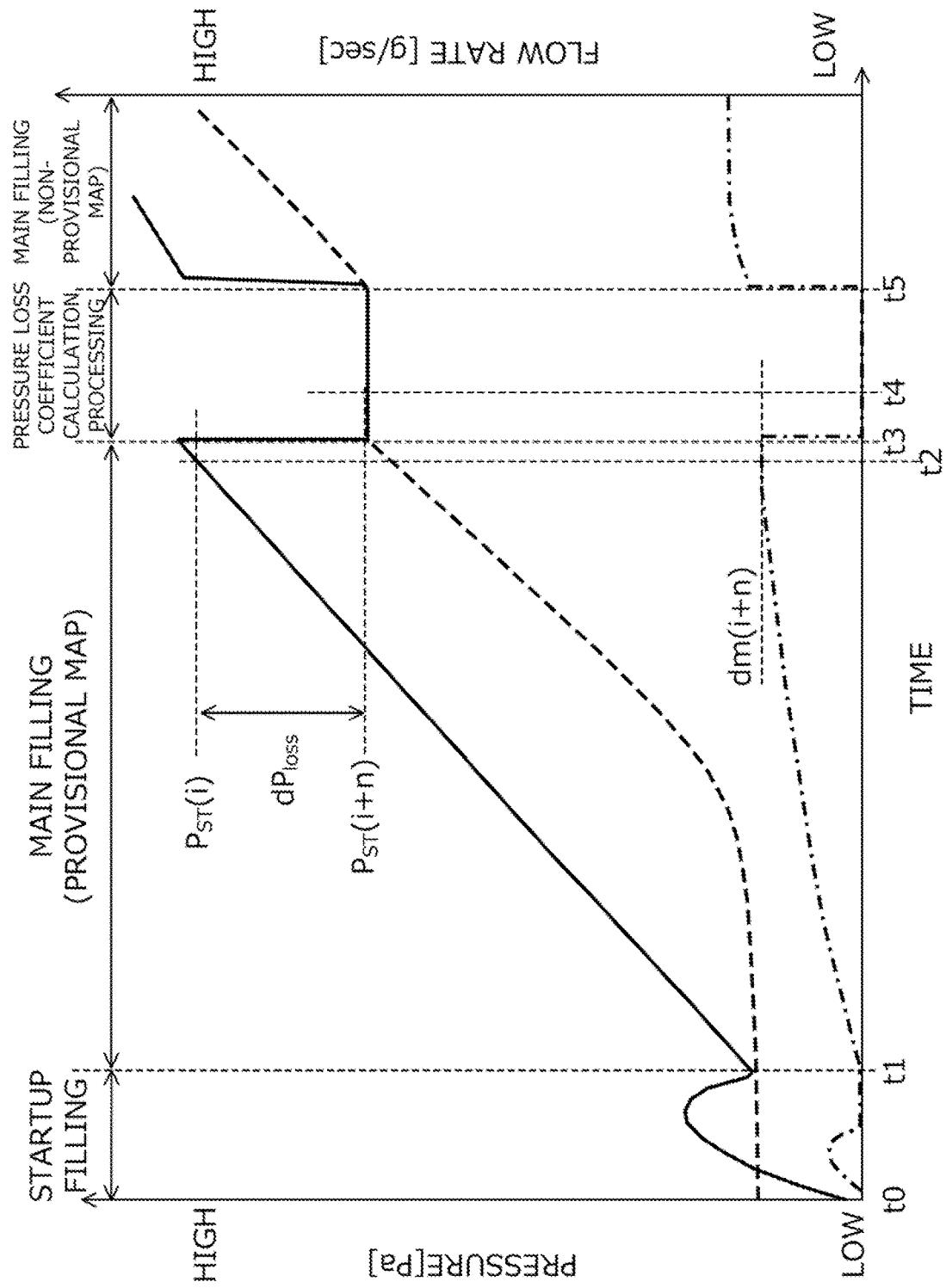
FIG. 6 is a time chart schematically showing a course of the filling of hydrogen gas carried out in line with the flowchart in FIG. 4.

FIG. 6 is a time chart schematically showing a course of the filling of hydrogen gas carried out in line with the flowchart in FIG. 4. In FIG. 6, the solid line indicates time-varying changes in the pressure detected by the station pressure sensor 73, the dashed line indicates time-varying changes in the pressure in the hydrogen tank 31, and the dash-dot line indicates time-varying changes in the flow rate detected by the flow rate sensor 71.

First, the station ECU 8 carries out the startup filling (see S1 in FIG. 4) during the period from t0 to t1, and sets the time t0 from which this pre-shot filling was started as the filling start time $t_{isi}$. At t1, the station ECU 8 selects the provisional map based on the value of the volume V of the hydrogen tank 31, and carries out the main filling based on the provisional map during the period from t1 to t3. As a result, the pressure in the connection pipe increases at the target pressure rise rate $\Delta P_{st}$ set based on the provisional map. Due to a pressure loss caused in the connection pipe, in the period from t1 to t3 during which hydrogen gas flows, the pressure (indicated by the solid line in FIG. 6) at the detection position of the station pressure sensor 73 in the connection pipe is higher than the pressure (indicated by the dashed line in FIG. 6) in the hydrogen tank located downstream of the detection position of the station pressure sensor 73. Note that in the following, a case will be described in which the time t0 at which the pre-shot filling was started is set as the filling start time $t_{ini}$. However, the present invention is not limited to this. The time t1 at which the main filling based on the provisional map is started following the end of the startup filling may be set as the filling start time $t_{isi}$.

Thereafter, at t2, the station ECU 8 acquires the values of the pressure $P_{ST}(i)$, the flow rate dm(i), and the temperature $T_{ST}(i)$ in the connection pipe immediately before the temporary stop of the filling of hydrogen gas. Then, at t3, the station ECU 8 temporarily stops the filling of hydrogen gas to perform the leakage check. At t4, the station ECU 8 newly acquires the value of the pressure $P_{ST}(i+n)$ in the connection pipe, in response to the lapse of the measurement wait time. At t3, the station ECU 8 calculates the value of the pressure loss coefficient $K_0$ by using the pressure $P_{ST}(i)$ and the pressure $P_{ST}(i+n)$ that have been acquired before and after the temporary stop of the filling of hydrogen gas, the temperature $T_{ST}(i)$, and the flow rate dm(i).

Thereafter, at t5, the station ECU 8 newly selects, as the non-provisional map, one filling control map based on the value of the pressure loss coefficient $K_0$ resulting from the pressure loss coefficient calculation processing performed during the period from t2 to t5, and resumes the main filling based on the non-provisional map. In this way, switching is performed from one filling control map to another suitable map corresponding to the current state of the connection pipe.

The hydrogen gas filling method of the present embodiment exerts the following effects.

(1) According to the hydrogen gas filling method, after the start of the filling of hydrogen gas based on the provisional map, the value of the pressure loss coefficient $K_0$ is calculated using the value that is detected by the station pressure sensor 73 when a decrease is caused in the flow rate of hydrogen gas in the connection pipe. With this use of the value detected by the station pressure sensor 73 when the decrease is caused in the flow rate of hydrogen gas, the hydrogen gas filling method can accurately calculate the value of the pressure loss coefficient $K_0$. The hydrogen gas filling method switches from one filling control map to another filling control map based on the calculated value of the pressure loss coefficient $K_0$, and continues the filling of hydrogen gas based on the latter filling control map. By performing switching between the filling control maps based on the value of the pressure loss coefficient $K_0$ in this way, the hydrogen gas filling method selects the optimal filling control map so that useless excess contained in the temperature set for the precooler 96 and the like is reduced, and can carry out the filling of gas based on the optimal filling control map.

(2) The station ECU 8 used in the hydrogen gas filling method selects, from the plurality of preset maps M11, . . . , and Mij, one suitable filling control map, and operates the flow rate control valve 95 under the condition defined in the suitable filling control map, thereby controlling the flow rate of hydrogen gas flowing through the connection pipe. The hydrogen gas filling method switches from one filling control map selected as the provisional map by the station ECU 8 to another filling control map determined based on the value of the pressure loss coefficient $K_0$ calculated in the above-described manner, thereby performing switching of the filling conditions. As can be seen, the hydrogen gas filling method performs the switching between the filling control maps based on the value of the pressure loss coefficient $K_0$. As a result, an optimal filling control map can be selected according to the value of the pressure loss coefficient $K_0$, from the plurality of filling control maps specified in the station ECU 8 in advance. This feature makes it possible to set as short a filling time period as possible according to the actual pressure loss, and to raise a temperature set for the precooler 96.

(3) The hydrogen gas filling method calculates the value of the pressure loss coefficient $K_0$ defined by Formula (5) described above, using the pressure difference $dP_{loss}$ between the pressures before and after the decrease in the flow rate of the hydrogen gas, the gas density ρ in the connection pipe, and the mass flow rate dm of the gas in the connection pipe. Thus, the hydrogen gas filling method makes it possible to determine the value of the pressure loss coefficient $K_0$ by performing a simple calculation.

(4) The hydrogen gas filling method calculates the value of the pressure loss coefficient $K_0$, by using the value that is detected by the station pressure sensor 73 when the flow rate of hydrogen gas in the connection pipe decreases from a value greater than 0 to 0 or to approximately 0. Thus, the hydrogen gas filling method can accurately calculate the value of the pressure loss coefficient $K_0$, and accordingly, can perform switching to a suitable filling control map corresponding to a state of the connection pipe.

In the foregoing, one embodiment of the present invention has been described. However, the present invention is not limited to the embodiment. Modifications may be made as appropriate to the configuration of the specifics of the present invention, without deviating from the scope of the spirit of the present invention.

For example, in the above description of the embodiment, the case has been described in which the temporary stopping of the filling of hydrogen gas for the leakage check was utilized to perform the pressure loss calculation processing (see FIG. 5) to calculate the pressure loss $dP_{loss}$ and the value of the pressure loss coefficient $K_0$. However, the timing at which the pressure loss $dP_{loss}$ and the value of the pressure loss coefficient $K_0$ are calculated is not limited thereto. The pressure loss $dP_{loss}$ and the value of the pressure loss coefficient $K_0$ may be calculated at any timing for whatever reason, provided that the timing is in a period which follows the start of the filling of hydrogen gas and in which the flow rate of hydrogen gas in the connection pipe decreases temporarily.

For example, there are some countries where the leakage check is not required by law. In such a country, since no leakage check may be carried out during filling of hydrogen gas, no opportunity may be provided for the calculation of the pressure loss $dP_{loss}$ and the value of the pressure loss coefficient $K_0$. However, even though the leakage check is not compulsory, there are cases where the main filling of hydrogen gas is temporarily stopped, for the purpose of, for example, replacement of the hydrogen tank in the hydrogen station 9. Therefore, in such cases, the time period for replacement of the tank in the hydrogen station 9 may be utilized to calculate the pressure loss $dP_{loss}$ and the value of the pressure loss coefficient $K_0$.

In the description of the above embodiment, the case has been described in which the values of the volume V of the tank, the pressure loss coefficient $K_0$, and the ambient temperature $T_{amb}$ are associated with the value of the four coefficients (a, b, c, d) by way of the plurality of filling control maps shown as examples in FIG. 3. However, the present invention is not limited thereto. The values of the volume V of the tank, the pressure loss coefficient $K_0$, and the ambient temperature $T_{amb}$ may be associated with the values of the four coefficients (a, b, c, d) by means other than the maps, more specifically, by way of a numerical formula, neural network, etc.

EXPLANATION OF REFERENCE NUMERALS

S: Hydrogen Refueling System
M: Vehicle (Movable Body)
31: Hydrogen Tank (Tank)
71: Flow Rate Sensor
72: Station Temperature Sensor
73: Station Pressure Sensor (Pressure Sensor)
74: Ambient Temperature Sensor
8: Station ECU
83: Target Pressure Rise Rate Setting Unit
831: Map Selection Unit
832: Pressure Rise Rate Calculation Unit
9: Hydrogen Station
91: Accumulator (Source)
93: Station Pipe (Pipe)
94: Shut-Off Valve
95: Flow Rate Control Valve (Control Valve)
96: Precooler

The invention claimed is:

1. A gas filling method for filling a movable body-mounted tank with gas supplied from a compressed gas source by means of a gas refueling system,
the gas refueling system including:
the compressed gas source,
a pipe connecting the compressed gas source to the movable body-mounted tank,
a control valve, a pressure sensor, and a flow rate sensor which are provided on the pipe, and
a control unit which controls a flow rate of the gas flowing through the pipe by operating the control valve under a predetermined filling condition,
the gas filling method comprising:
acquiring a value of a volume of the tank;
calculating a value of a pressure loss parameter having a correlation to a pressure loss caused in the pipe, by using a value which is detected by the pressure sensor when a decrease is caused in the flow rate of the gas in the pipe after start of filling of the gas;
selecting, by the control unit, a first filling control map from a plurality of preset filling control maps; and
operating, by the control unit, the control valve under a filling condition defined in the first filling control map selected by the control unit,
switching the filling condition to another filling condition which is determined based on the value of the pressure loss parameter so as to continue the filling of the gas,
wherein the switching the filling condition includes performing switching from the first filling control map selected by the control unit to a second filling control map which is included in the plurality of filling control maps and is determined based on the value of the volume of the tank and the value of the pressure loss parameter.

2. The gas filling method according to claim 1, wherein the calculating the value of the pressure loss parameter includes determining the value of the pressure loss parameter according to Formula (1) below, $$k_0 = \frac{dP_{loss} \cdot \rho}{dm^2} \quad (1)$$

wherein "$k_0$" is the pressure loss parameter, "$dP_{loss}$" is a pressure difference in the pipe between a pressure before the decrease in the flow rate of the gas and a pressure after the decrease, "$\rho$" is a density of the gas in the pipe, and "$dm$" is a mass flow rate of the gas in the pipe.

3. The gas filling method according to claim 1, wherein the calculating the value of the pressure loss parameter includes using a value which is detected by the pressure sensor when the flow rate of the gas in the pipe decreases from a value greater than 0 to 0 or to approximately 0 to determine the value of the pressure loss parameter.

4. The gas filling method according to claim 2, wherein the calculating the value of the pressure loss parameter includes using a value which is detected by the pressure sensor when the flow rate of the gas in the pipe decreases from a value greater than 0 to 0 or to approximately 0 to determine the value of the pressure loss parameter.

* * * * *